United States Patent
Basso et al.

(10) Patent No.: US 7,469,332 B2
(45) Date of Patent: Dec. 23, 2008

(54) SYSTEMS AND METHODS FOR ADAPTIVELY MAPPING AN INSTRUCTION CACHE

(75) Inventors: Claude Basso, Raleigh, NC (US); Jean Louis Calvignac, Raleigh, NC (US); Chih-jen Chang, Apex, NC (US); Harm Peter Hofstee, Austin, TX (US); Jens Leenstra, Bondorf (DE); Hans-Werner Tast, Weil im Schoenbuch (DE); Fabrice Jean Verplanken, LaGaude (FR); Colin Beaton Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 11/070,758

(22) Filed: Mar. 2, 2005

(65) Prior Publication Data

US 2006/0200615 A1    Sep. 7, 2006

(51) Int. Cl.
*G06F 9/355* (2006.01)
(52) U.S. Cl. .................. 711/203; 711/206; 711/125
(58) Field of Classification Search ............. 711/3, 711/125, 202, 203, 205
See application file for complete search history.

(56) References Cited

U.S. PATENT DOCUMENTS

| 5,367,653 | A | * | 11/1994 | Coyle et al. | 711/128 |
| 6,129,458 | A | * | 10/2000 | Waters et al. | 711/133 |
| 6,535,959 | B1 | * | 3/2003 | Ramprasad et al. | 711/125 |
| 2003/0033461 | A1 | | 2/2003 | Malik et al. | |
| 2003/0154342 | A1 | * | 8/2003 | Southwell et al. | 711/3 |

FOREIGN PATENT DOCUMENTS

EP    0 674 268 A2    9/1995

OTHER PUBLICATIONS

Gideon Intrater, et al., "Performance Evaluation of a Decoded Instruction Cache for Variable Instruction-Length Computers," 1992 ACM, pp. 106-113.

* cited by examiner

*Primary Examiner*—Hyung Sough
*Assistant Examiner*—Kenneth M Lo
(74) *Attorney, Agent, or Firm*—Joscelyn C. Cockburn; Schubert Osterrieder & Nickelson PLLC (57) ABSTRACT

Systems and methods for adaptively mapping system memory address bits into an instruction tag and an index into the cache are disclosed. More particularly, hardware and software are disclosed for observing collisions that occur for a given mapping of system memory bits into a tag and an index. Based on the observations, an optimal mapping may be determined that minimizes collisions.

14 Claims, 4 Drawing Sheets

FIG 4 ance. In addition, processing speed has increased much more quickly than main memory accesses. As a result, cache memories, or caches, are often used...

SYSTEMS AND METHODS FOR ADAPTIVELY MAPPING AN INSTRUCTION CACHE

FIELD

The present invention is in the field of digital processing. More particularly, the invention is in the field of adaptive loading and addressing of an instruction cache.

BACKGROUND

Many different types of computing systems have attained widespread use around the world. These computing systems include personal computers, servers, mainframes and a wide variety of stand-alone and embedded computing devices. Sprawling client-server systems exist, with applications and information spread across many PC networks, mainframes and minicomputers. In a distributed system connected by networks, a user may access many application programs, databases, network systems, operating systems and mainframe applications. Computers provide individuals and businesses with a host of software applications including word processing, spreadsheet, accounting, e-mail, voice over Internet protocol telecommunications, and facsimile.

Users of digital processors such as computers continue to demand greater and greater performance from such systems for handling increasingly complex and difficult tasks. In addition, processing speed has increased much more quickly than that of main memory accesses. As a result, cache memories, or caches, are often used in many such systems to increase performance in a relatively cost-effective manner. Many modern computers also support "multi-tasking" or "multi-threading" in which two or more programs, or threads of programs, are run in alternation in the execution pipeline of the digital processor. Thus, multiple program actions can be processed concurrently using multi-threading.

At present, every general purpose computer, from servers to low-power embedded processors, includes at least a first level cache L1 and often a second level cache L2. This dual cache memory system enables storing frequently accessed data and instructions close to the execution units of the processor to minimize the time required to transmit data to and from memory. L1 cache is typically on the same chip as the execution units. L2 cache is typically external to the processor chip but physically close to it. Accessing the L1 cache is faster than accessing the more distant system memory. Ideally, as the time for execution of an instruction nears, instructions and data are moved to the L2 cache from a more distant memory. When the time for executing the instruction is near imminent, the instruction and its data, if any, is advanced to the L1 cache. Moreover, instructions that are repeatedly executed may be stored in the L1 cache for a long duration. This reduces the occurrence of long latency system memory accesses.

As the processor operates in response to a clock, an instruction fetcher accesses data and instructions from the L1 cache and controls the transfer of instructions from more distant memory to the L1 cache. A cache miss occurs if the data or instructions sought are not in the cache when needed. The processor would then seek the data or instructions in the L2 cache. A cache miss may occur at this level as well. The processor would then seek the data or instructions from other memory located further away. Thus, each time a memory reference occurs which is not present within the first level of cache, the processor attempts to obtain that memory reference from a second or higher level of memory. When a data cache miss occurs, the processor suspends execution of the instruction calling for the missing data while awaiting retrieval of the data. While awaiting the data, the processor execution units could be operating on another thread of instructions. In a multi-threading system the processor would switch to another thread and execute its instructions while operation on the first thread is suspended. Thus, thread selection logic is provided to determine which thread is to be next executed by the processor.

A common architecture for high performance, single-chip microprocessors is the reduced instruction set computer (RISC) architecture characterized by a small simplified set of frequently used instructions for rapid execution. Thus, in a RISC architecture, a complex instruction comprises a small set of simple instructions that are executed in steps very rapidly. As semiconductor technology has advanced, the goal of RISC architecture has been to develop processors capable of executing one or more instructions on each clock cycle of the machine. Execution units of modern processors therefore have multiple stages forming an execution pipeline. On each cycle of processor operation, each stage performs a step in the execution of an instruction. Thus, as a processor cycles, an instruction advances through the stages of the pipeline. As it advances, the steps in the execution of the instruction are performed. Moreover, in a superscalar architecture, the processor comprises multiple execution units operating in parallel to execute different instructions in parallel.

The L1 cache of a processor stores copies of recently executed, and soon-to-be-executed, instructions. These copies are obtained from "cache lines" of system memory. A cache line is a unit of system memory from which an instruction to be stored in the cache is obtained. The address or index of a cache entry may be determined from the lower order bits of the system memory address of the cache line to be stored at that entry. Multiple system memory addresses therefore map into the same cache index. The higher order bits of the system memory address form a tag. The tag is stored with the instruction in the cache entry corresponding to the lower order bits. The tag uniquely identifies the instruction with which it is stored.

A collision occurs when an instruction is called from system memory that maps into a cache entry where a valid instruction is already stored. When this occurs the processor makes a decision whether to overwrite the stored instruction. A way to reduce collisions is to increase the associativity of the cache. An n-way associative cache maps each one of a multiple of system memory addresses to one of n cache memory locations within a cache entry. The tag bits at a cache entry are compared to the tag derived from the program counter that points to the system memory address of the instruction. In this way, the correct instruction to be retrieved from the cache is identified. A 1-way associative cache is called a direct mapped cache and results in a high probability of collisions. In an n-way associative cache, a collision can be avoided by selectively placing the instruction from system memory into an empty one of the n locations within the cache entry. Thus, an n-way associative cache reduces collisions. Indeed, a fully associative cache might avoid collisions altogether. However, the cost and space of implementing associativity increases with increased associativity. Therefore, an improved method for reducing collisions without the cost of increased associativity is needed.

SUMMARY

The problems identified above are in large part addressed by systems and methods for adaptively mapping an instruction cache. Embodiments implement a digital processor comprising an instruction cache and an address mapper. The instruction cache stores instructions copied from system memory. Each instruction is stored at a memory location identified by an index determined from the system memory address of the instruction. Each instruction stored in the cache is identified by a tag determined from the system memory address of the instruction. The address mapper adaptively maps bits of the system memory address to a set of bits to form the tag of the instruction and a set of bits to form the index where the instruction is stored. Observations of collisions for a given mapping are made to determine a mapping that reduces collisions.

In one embodiment a digital system for processing data, comprises a system memory and an instruction cache to receive instructions from the system memory. A program counter sequentially provides instruction addresses. An address mapper provides a mapping function to map each address into a tag to identify an instruction in the instruction cache and an index to point to a location in the cache for storing the instruction. Embodiments further comprise an instruction fetcher to cause instructions from the system memory to be copied to the instruction cache with a tag that is determined from the mapping function at an index that is determined from the mapping function. Embodiments further comprise an analysis module that determines collisions for a plurality of different mappings of system memory address bits into a tag and an index to determine which one of the plurality of different mappings produces the least collisions Another embodiment is a machine-accessible medium containing instructions effective, when executing in a data processing system, to cause the data processing system to perform operations comprising observing instruction cache collisions over a time interval. Based on the observations, the system determines a mapping of bits of a system memory address into a tag and an index that reduces instruction cache collisions. Operations further comprising causing a change of the mapping of system memory address bits by the system and causing the instruction cache contents to be flushed when the mapping is changed.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Embodiments include systems and methods for adaptively mapping an instruction cache. A digital system with a system memory provides instructions stored in the system memory to an instruction cache of a processor within the digital system. The system memory address is mapped to an index and a tag. The index is the location in the cache where the instruction from system memory is stored. The tag is stored with the instruction in the cache and serves to identify the instruction. The tag and index are determined from the system memory address of the instruction by an address mapper. By observing collisions for a given mapping a new mapping that reduces collisions can be determined.

Figure 1:
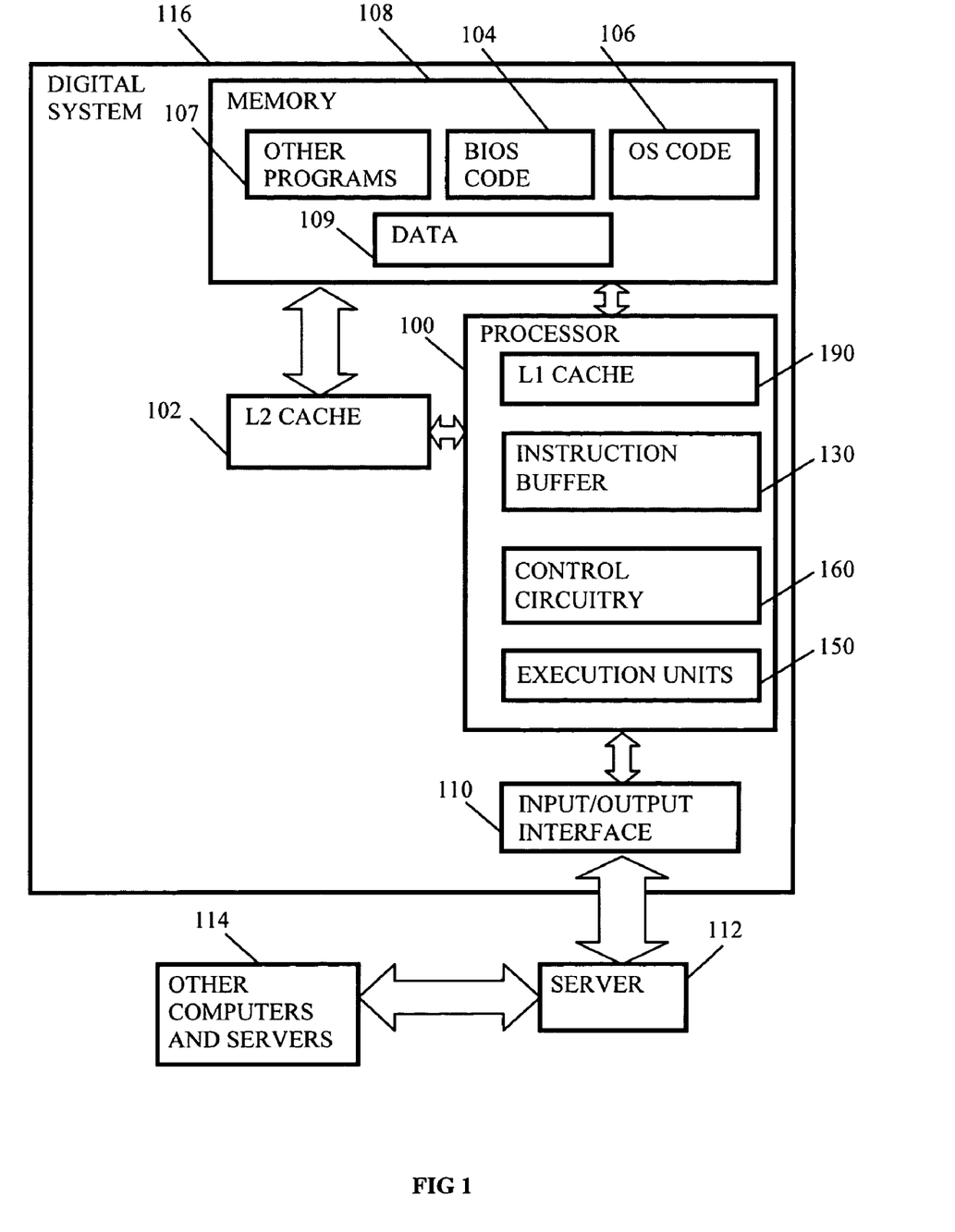
FIG. 1 depicts a digital system within a network; within the digital system is a digital processor.

FIG. 1 shows a digital system 116 such as a computer or server implemented according to one embodiment of the present invention. Digital system 116 comprises a processor 100 that can operate according to BIOS Code 104 and Operating System (OS) Code 106. The BIOS and OS code is stored in memory 108. The BIOS code is typically stored on Read-Only Memory (ROM) and the OS code is typically stored on the hard drive of computer system 116. Memory 108 also stores other programs 107 for execution by processor 100 and stores data 109 Digital system 116 comprises a level 2 (L2) cache 102 located physically close to multi-threading processor 100.

Processor 100 comprises an on-chip level one (L1) cache 190, an instruction fetcher 130, control circuitry 160, and execution units 150. Level 1 cache 190 receives and stores instructions that are near to time of execution. Instruction fetcher 130 causes instructions to be loaded into cache 190 from system memory external to the processor. Instruction fetcher 130 also receives instructions from cache 190 and sends them to execution units 150. Execution units 150 perform the operations called for by the instructions. Execution units 150 may comprise load/store units, integer Arithmetic/Logic Units, floating point Arithmetic/Logic Units, and Graphical Logic Units. Each execution unit comprise stages to perform steps in the execution of the instructions received from instruction buffer 130. Control circuitry 160 controls instruction buffer 130 and execution units 150. Control circuitry 160 also receives information relevant to control decisions from execution units 150. For example, control circuitry 160 is notified in the event of a data cache miss in the execution pipeline.

Digital system 116 also typically includes other components and subsystems not shown, such as: a Trusted Platform Module, memory controllers, random access memory (RAM), peripheral drivers, a system monitor, a keyboard, one or more flexible diskette drives, one or more removable non-volatile media drives such as a fixed disk hard drive, CD and DVD drives, a pointing device such as a mouse, and a network interface adapter, etc. Digital systems 116 may include personal computers, workstations, servers, mainframe computers, notebook or laptop computers, desktop computers, or the like. Processor 100 may also communicate with a server 112 by way of Input/Output Device 110. Server 112 connects system 116 with other computers and servers 114. Thus, digital system 116 may be in a network of computers such as the Internet and/or a local intranet.

In one mode of operation of digital system 116, the L2 cache receives from memory 108 data and instructions expected to be processed in the processor pipeline of processor 100. L2 cache 102 is fast memory located physically close to processor 100 to achieve greater speed. The L2 cache 102 receives from memory 108 the instructions for a plurality of instruction threads. Such instructions may include branch instructions. The L1 cache 190 is located in the processor and contains data and instructions preferably received from L2 cache 102. Ideally, as the time approaches for a program instruction to be executed, the instruction is passed with its data, if any, first to the L2 cache, and then as execution time is near imminent, to the L1 cache.

Execution units 150 execute the instructions received from the L1 cache 190. Execution units 150 may comprise load/store units, integer Arithmetic/Logic Units, floating point Arithmetic/Logic Units, and Graphical Logic Units. Each of the units may be adapted to execute a specific set of instructions. Instructions can be submitted to different execution units for execution in parallel. In one embodiment, two execution units are employed simultaneously to execute a single x-form store instruction. Data processed by execution units 150 are storable in and accessible from integer register files and floating point register files (not shown.) Data stored in these register files can also come from or be transferred to on-board L1 cache 190 or an external cache or memory. The processor can load data from memory, such as L1 cache, to a register of the processor by executing a load instruction. The processor can store data into memory from a register by executing a store instruction.

An instruction can become stalled in its execution for a plurality of reasons. An instruction is stalled if its execution must be suspended or stopped. One cause of a stalled instruction is a data cache miss. A data cache miss occurs if, at the time for executing a step in the execution of an instruction, the data required for execution is not in the L1 cache 190. If a data cache miss occurs, data can be received into the L1 cache directly from memory 108, bypassing the L2 cache 102. Accessing data in the event of a data cache miss is a relatively slow process. When a data cache miss occurs, an instruction cannot continue execution until the missing data is retrieved. While this first instruction is waiting, feeding other instructions to the pipeline for execution is desirable.

An instruction cache miss occurs when a next instruction to be retrieved from the L1 instruction cache (I-cache) is not there. The instruction must then be retrieved from system memory such as an L2 instruction cache 102. This takes a relatively long time so avoiding instruction cache misses is desirable. To avoid this latency, the I-cache will receive groups of sequential instructions to increase the probability that a needed instruction will be in the I-cache. Moreover, keeping in the I-cache instructions that are called for repeatedly is desirable. A collision occurs when an instruction called into the cache must overwrite an instruction already in the cache. If the overwritten instruction must be called back into the cache, a long-latency memory access is needed. To avoid this, reduction of collisions is desirable. Accordingly, embodiments provide for the reduction of collisions by changing the mapping of system memory address bits into a tag and an index.

Figure 2:
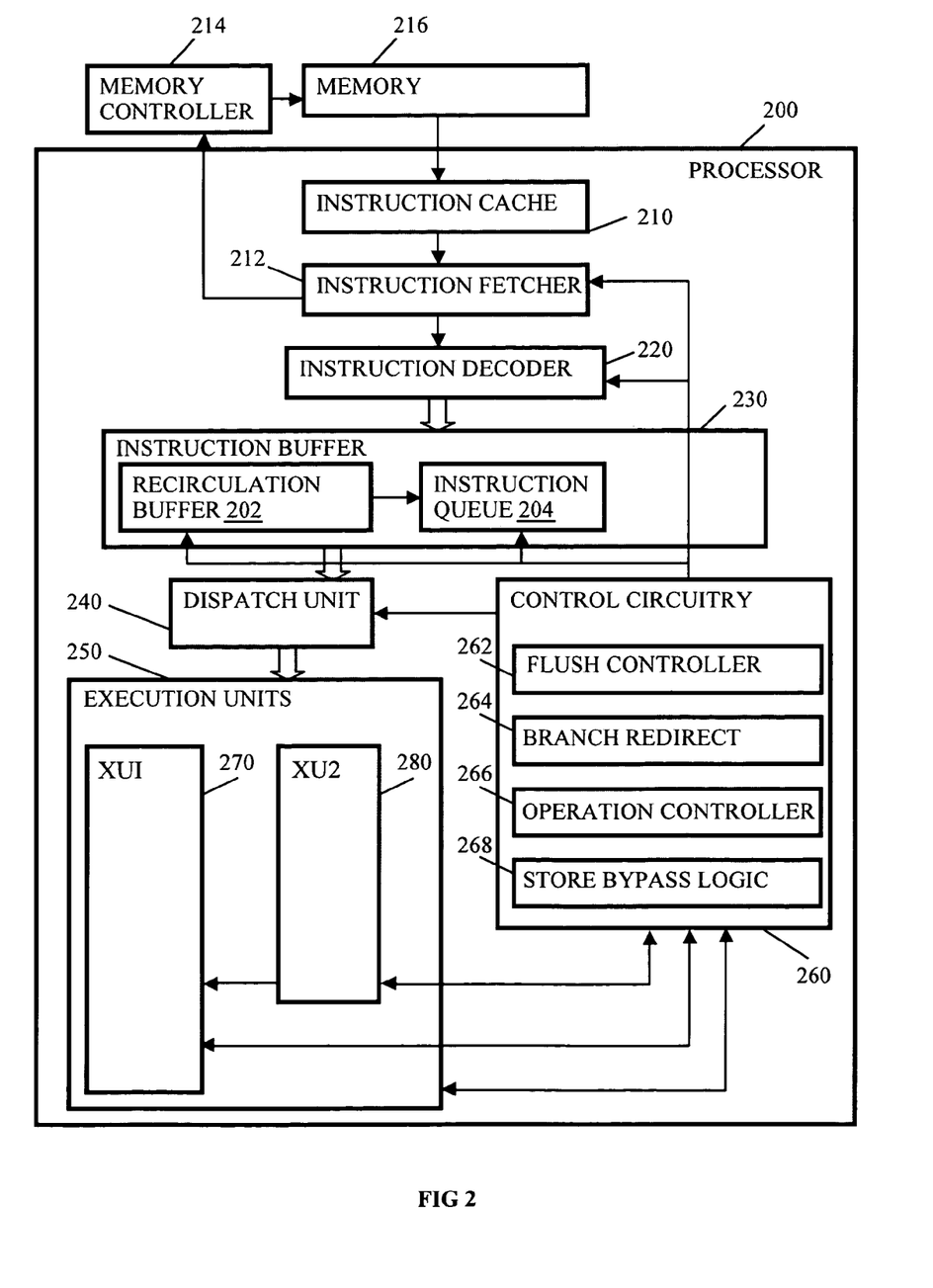
FIG. 2 depicts a digital processor with adaptive instruction cache mapping.

FIG. 2 shows an embodiment of a processor 200 that can be implemented in a digital system such as digital system 116. A level 1 I-cache 210 receives instructions from memory 216 external to the processor, such as level 2 cache. In one embodiment, as instructions for different threads approach a time of execution, they are transferred from a more distant memory to an L2 cache. As execution time for an instruction draws near it is transferred from the L2 cache to the L1 instruction cache 210.

An instruction fetcher 212 maintains a program counter and fetches instructions from instruction cache 210. The program counter of instruction fetcher 212 comprises an address of a next instruction to be executed. The program counter may normally increment to point to the next sequential instruction to be executed, but in the case of a branch instruction, for example, the program counter can be set to point to a branch destination address to obtain the next instruction. In one embodiment, when a branch instruction is received, instruction fetcher 212 predicts whether the branch is taken. If the prediction is that the branch is taken, then instruction fetcher 212 fetches the instruction from the branch target address. If the prediction is that the branch is not taken, then instruction fetcher 212 fetches the next sequential instruction. In either case, instruction fetcher 212 continues to fetch and send to decode unit 220 instructions along the instruction path taken. After so many cycles, the branch instruction is executed in a branch processing unit of execution units 250 and the correct path is determined. If the wrong branch was predicted, then the pipeline must be flushed of instructions younger than the branch instruction. In many embodiments, the branch instruction is resolved as early as possible in the pipeline to reduce branch execution latency.

Instruction fetcher 212 also performs pre-fetch operations. Thus, instruction fetcher 212 communicates with a memory controller 214 to initiate a transfer of instructions from a memory 216 to I-cache 210. The place in the cache to where an instruction is transferred from system memory 216 is determined by an index determined from the system memory address. The index is the address of a cache entry. With each instruction stored in the cache, a tag is also stored. The tag identifies the instruction stored at the cache entry. In an n-way associative cache, there are n locations to store an instruction within a cache entry. To determine which one of the n-locations stores the instruction called for by the program counter of the instruction fetcher, a tag comparator within the instruction fetcher compares the tag from the program counter to the tag of each instruction at the cache entry until the correct instruction is found. Conventionally, the index of an instruction is the lower order bits of the system memory address of the instruction, and the tag of the instruction is the higher order bits of the system memory address of the instruction. However, as discussed below, embodiments implement a changeable mapping of system memory address bits into a tag and an index to reduce collisions.

Instruction fetcher retrieves instructions passed to I-cache 210 and passes them to an instruction decoder 220. Instruction decoder 220 receives and decodes the instructions fetched by instruction fetcher 212. One type of instruction received into instruction decoder 220 comprises an OPcode, a destination address, a first operand address, and a second operand address:

| OPCODE | First Operand Address | Second Operand Address | Destination Address |
|--------|----------------------|------------------------|---------------------|

The OPcode is a binary number that indicates the arithmetic, logical, or other operation to be performed by the execution units 250. When an instruction is executed, the processor passes the OPcode to control circuitry that directs the appropriate one of execution units 250 to perform the operation indicated by the OPcode. The first operand address and second operand address locate the first and second operands in a memory data register within the processor. The destination address locates where to place the results in the memory data register. Thus, an execution unit will perform the indicated operation on the first and second operand and store the result at the destination address.

Instruction buffer 230 receives the decoded instructions from instruction decoder 220. Instruction buffer 230 comprises memory locations for a plurality of instructions.

Instruction buffer 230 may reorder the order of execution of instructions received from instruction decoder 220. Instruction buffer 230 thereby provides an instruction queue 204 to provide an order in which instructions are sent to a dispatch unit 240. For example, in a multi-threading processor, instruction buffer 230 may form an instruction queue that is a multiplex of instructions from different threads. Each thread can be selected according to control signals received from control circuitry 260. Thus, if an instruction of one thread becomes stalled in the pipeline, an instruction of a different thread can be placed in the pipeline while the first thread is stalled.

Instruction buffer 230 may also comprise a recirculation buffer mechanism 202 to handle stalled instructions. Recirculation buffer 202 is able to point to instructions in instruction buffer 230 that have already been dispatched and have become stalled. If an instruction is stalled because of, for example, a data cache miss, the instruction can be reintroduced into instruction queue 203 to be re-executed. This is faster than retrieving the instruction from the instruction cache. By the time the instruction again reaches the stage where the data is required, the data may have by then been retrieved. Alternatively, the instruction can be reintroduced into instruction queue 204 only after the needed data is retrieved.

Dispatch unit 240 dispatches the instruction received from instruction buffer 230 to execution units 250. In a superscalar architecture, execution units 250 may comprise load/store units, integer Arithmetic/Logic Units, floating point Arithmetic/Logic Units, and Graphical Logic Units, all operating in parallel. Dispatch unit 240 therefore dispatches instructions to some or all of the executions units to execute the instructions simultaneously. Execution units 250 comprise stages to perform steps in the execution of instructions received from dispatch unit 240. Data processed by execution units 250 are storable in and accessible from integer register files and floating point register files not shown. Data stored in these register files can also come from or be transferred to an on-board data cache or an external cache or memory.

FIG. 2 shows a first execution unit (XU1) 270 and a second execution unit (XU2) 280 of a processor with a plurality of execution units. Each stage of each of execution units 250 is capable of performing a step in the execution of a different instruction. In each cycle of operation of processor 200, execution of an instruction progresses to the next stage through the processor pipeline within execution units 250. Those skilled in the art will recognize that the stages of a processor "pipeline" may include other stages and circuitry not shown in FIG. 2. In a multi-threading processor, each stage of an execution unit can process a step in the execution of an instruction of a different thread. Thus, in a first cycle, execution unit stage 1 may perform a first step in the execution of an instruction of a first thread. In a second cycle, next subsequent to the first cycle, execution unit stage 2 may perform a next step in the execution of the instruction of the first thread. During the second cycle, execution unit stage 1 performs a first step in the execution of an instruction of a second thread. And so forth.

FIG. 2 also shows control circuitry 260. Control circuitry 260 comprises circuitry to perform a variety of functions that control the operation of processor 200. For example, control circuitry 260 may comprise a branch redirect unit 264 to redirect instruction fetcher 212 when a branch is determined to have been mispredicted. Control circuitry 260 may further comprise a flush controller 262 to flush instructions younger than the mispredicted branch instruction. An operation controller 266 interprets the OPCode contained in an instruction and directs the appropriate execution unit to perform the indicated operation. Store bypass logic 268 performs store bypass operations to transfer store data from one or more of execution units 250 to a load/store unit (LSU). Control circuitry 260 may further comprise thread selection circuitry to select among instruction threads to execute.

Figure 3:
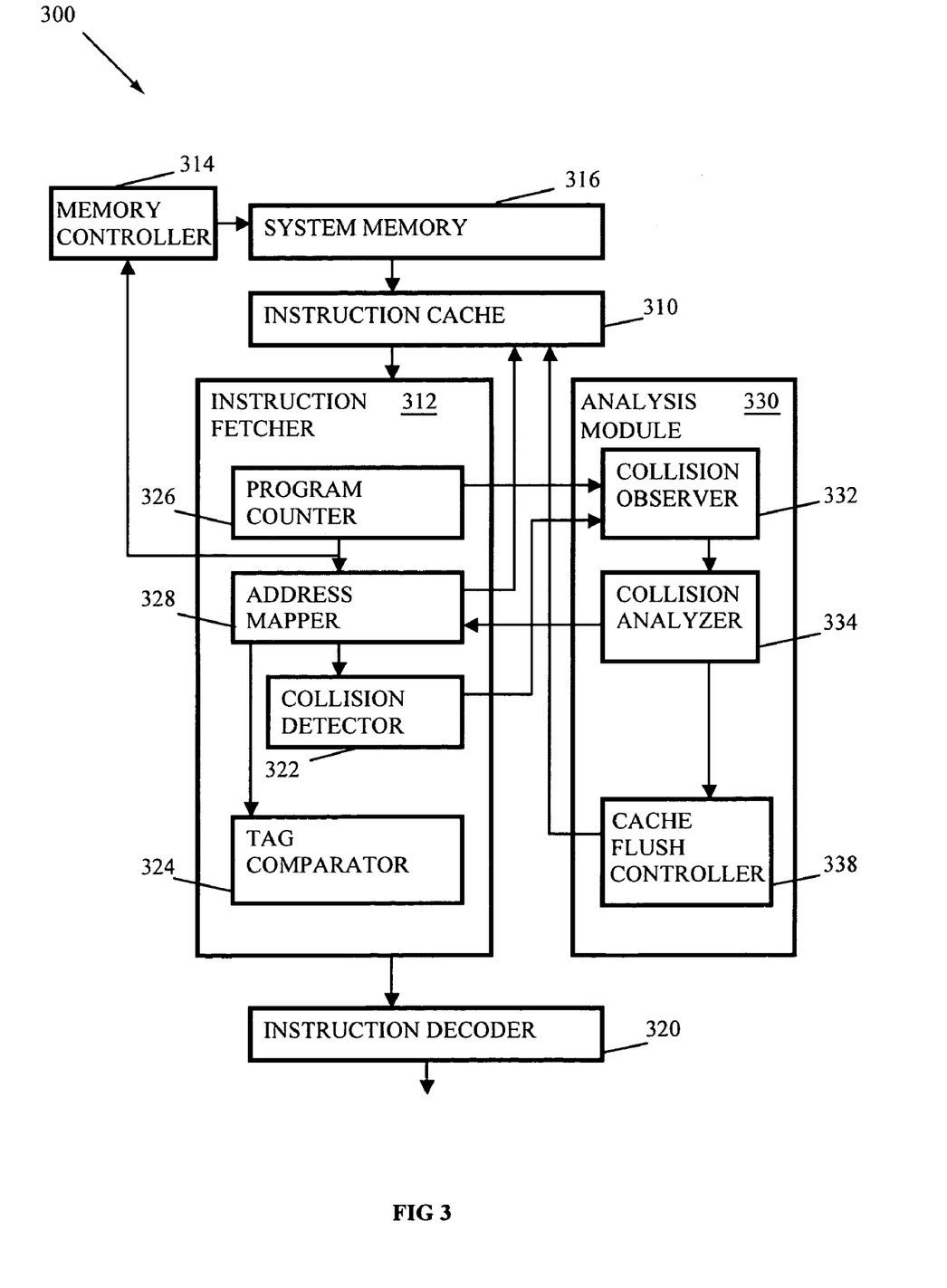
FIG. 3 depicts a more detailed view of an embodiment for adaptive instruction cache mapping.

FIG. 3 shows a more detailed view of an embodiment 300 for adaptive I-cache mapping. A program counter 326 within instruction fetcher 312 is incremented to give the system memory address of a next sequential instruction. An address mapper 328 maps this address into a tag and an index. That is, some of the bits of the address from the program counter will be used as a tag and some of the bits of the address will be used as an index. Which bits are assigned to the tag and which bits are assigned to the index are determined according to a mapping function that instruction fetcher 312 receives from an analysis module 330. The index is the address of a cache entry in instruction cache 310 where a copy of an instruction and its tag are stored. Since only some of the bits of the address from the program counter are used as an index, many system memory addresses will map to the same index. However, each system memory address that has the same index will have a unique tag. Thus, the tag uniquely identifies the instruction stored at a cache entry.

When the tag derived from the program counter matches a tag stored at the index, the instruction called for by the program counter is in the cache. This is called a cache hit. A cache miss occurs when the tag from the program counter matches no tag at a cache entry, indicating that the sought instruction is not in the cache. When a cache miss occurs, instruction fetcher 312 must fetch the instruction called for by the program counter from system memory 316. Thus, the address from the program counter passes to memory controller 314 to cause a transfer of a copy of the instruction from system memory to the cache. The instruction and its tag are stored at the cache entry corresponding to the index determined by mapper 328 from program counter 320. The previous instruction stored at that location, if any, is overwritten.

A collision occurs when an instruction from system memory called for by program counter 326 must replace a previous instruction stored at the index derived from the program counter. Collisions are not desired because there may be a very high probability that the replaced instruction will have to be retrieved again from system memory. Thus, collisions increase long latency memory accesses. One way to reduce collisions is to increase the associativity of the cache. Consider for example, a two-way associative cache. Each cache entry can hold two cache lines. Therefore, instructions from two different system memory addresses with the same index can be stored at a cache entry without collision. The tag identifies which of the two cache lines stored at the entry is called for by the program counter. To perform this identification, a tag comparator 324 compares the tag derived from the program counter to each tag stored at the cache entry to find a match.

Increasing cache associativity is relatively costly so embodiments are provided for reducing collisions with an existing level of associativity. An analysis module 330 observes collisions and determines a mapping function that reduces the probability of collisions. A collision detector 322 detects the occurrence of collisions. Associated and stored with each cache line is a valid bit that indicates whether the instruction stored at the cache entry is a valid instruction. A collision is detected when a cache entry corresponding to the index derived from the program counter is full of valid instructions and the instruction to be retrieved from system memory 316 maps to that index. When this occurs, one of the instructions at that entry must be replaced by the new instruction retrieved from system memory 316. One policy for replacement is to replace the Least Recently Used (LRU) instruction at the cache entry. Other replacement policies can be implemented.

A collision observer 332 within analysis module 320 observes, over a finite time period, the collisions that occur for a given mapping. Collision observer 332 may observe collisions detected by collision detector 322. Alternatively or additionally, collision observer 332 may receive the value of program counter 326, map this value for a trial mapping to a tag and an index, observe the mapping of instructions into the cache over time and determine the collisions that occur under the trial mapping. This can be done under software direction in the background. Thus, the functions of analysis module 330 can be implemented in software that is stored in system memory and executed by the processor.

Within the computer system memory are stored instructions that are executed over and over again. These instructions are sometimes referred to as steady state code. In networking systems, for example, that handle information packet communications, code common to processing all packets is steady state. Ideally steady state code should be held in I-cache 310 because the code is executed repetitively. Therefore, collisions with steady state code are to be avoided. However, steady state code is not stored in one sequential block within system memory 316, but is rather distributed throughout system memory 316. It follows that steady state code will also be distributed in the I-cache. The distribution of steady state code in the I-cache depends on the chosen mapping of system memory address bits into a tag and an index. For a given mapping, collision observer 332 observes the mapping of instructions into the I-cache over time. The observations of collision observer 332 will reveal that under the given mapping some cache entries do not change, while others are changed by collision. One therefore may search for a mapping function that produces the least amount of collisions, or the least amount of collisions with steady state code.

A collision analyzer 334 analyzes the observations of collision observer 332. For example, collision analyzer 334 may determine a level of collisions with steady state code stored in the I-cache for a given mapping of system memory address bits into an index and a tag. Collision analyzer 334 generates mappings which collision observer 332 applies to the program counter. For each mapping that collision analyzer 334 generates, collision observer 332 observes the mapping of instructions into the I-cache over time under the generated mapping. After a number of observations, collision analyzer 334 may pick the mapping that, based on the observations, produces the least collisions or the least collisions with steady state code. Alternatively, collision analyzer 334 may adaptively determine and test successive mappings derived according to criteria or an algorithm to determine an optimal mapping for reducing collisions.

Collision analyzer 334 passes an optimal mapping to address mapper 328 to change which system memory address bits are mapped into a tag and which are mapped into an index. At this time a cache flush controller 338 flushes I-cache 310 and the cache is reloaded according to the new mapping. Thus, collision analyzer 334 may determine the mapping that results in a minimum of collisions with steady state code over time and transfer that mapping to be applied by address mapper 328.

Figure 4:
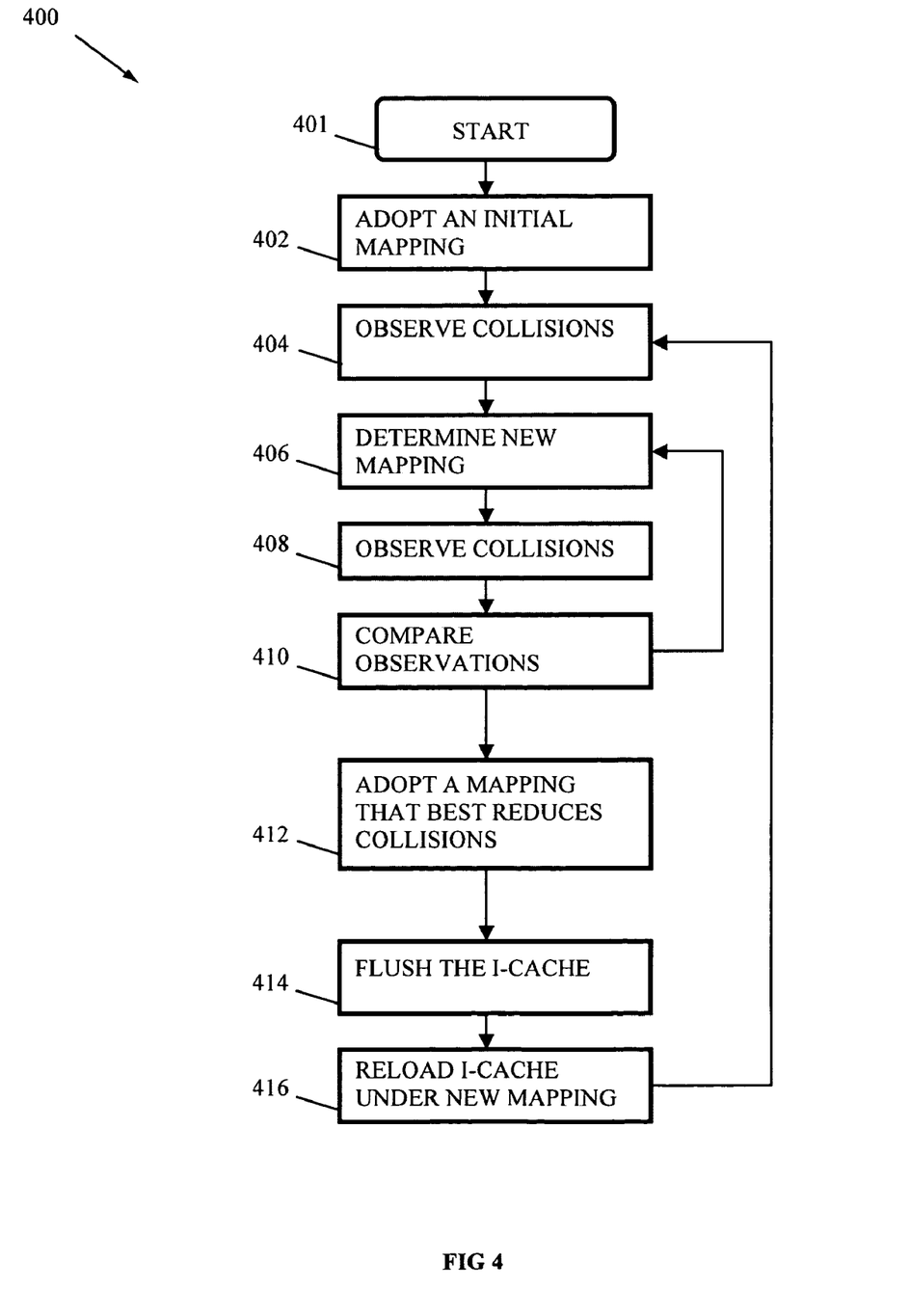
FIG. 4 depicts a flow chart of an embodiment for adaptive I-cache mapping in a processor.

FIG. 4 shows a flow chart 400 of an embodiment for adaptive I-cache mapping in a processor. At start-up (element 401) the processor adopts an initial mapping of system memory address bits into an address and a tag (element 402.) For example, the processor may adopt as an initial mapping a conventional mapping of lower order bits into an index and higher order bits into a tag. The initial mapping will produce a pattern of collisions that the processor observes over time (element 404.) The processor then determines a new trial mapping (element 406.) The processor observes the program counter and the collisions that would occur under the new mapping (element 408.) The processor compares the observations (element 410) and may determine a new mapping (element 406) chosen at random or based on the observations. This may be done iteratively so that each successive mapping function of the plurality of mapping functions observed is determined from a previous mapping function. Again, the processor observes collisions under the new mapping (element 408.) After a number of observations are made and compared (element 410), the processor adopts a mapping based on the observations that best reduces collisions (element 412.) Thus, the processor may determine a mapping that is optimal in some determinable sense. The processor then flushes the instruction cache (element 414) and reloads it according to the adopted mapping (element 416.)

As noted above, processes described herein can be implemented in software. Thus, another embodiment of the invention provides a machine-accessible medium containing instructions effective, when executing in a data processing system, to cause the system to perform a series of operations for adaptive I-cache mapping. The series of operations generally include observing collisions over a time interval and determining a mapping of bits of a system memory address into a tag and an index that reduces collisions. The series of operations may also generally include observing collisions for a plurality of different mappings of system memory address bits to determine which one of the plurality of different mappings produces the least collisions. The series of operations may also generally include causing a change in the mapping of system memory address bits by the system and causing the instruction cache contents to be flushed when the mapping is changed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for adaptively mapping an instruction cache, comprising:

receiving addresses from a program counter, each address corresponding to a location in a system memory where an instruction is stored;

defining a plurality of mapping functions, wherein each mapping function which maps different bits of an address received from the program counter into a tag to identify an instruction stored in the system memory at the address provided by the program counter and an index to identify a location in an instruction cache for storing the instruction and the tag; each mapping function mapping a different number of address bits into the tag and into the index so that a different number of collisions will occur under each different mapping functions;

observing, for each of the plurality of mapping functions, during execution of multiple programs, a mapping of a sequence of addresses from the program counter to determine, for each mapping function, a number of collisions; wherein a collision is an occurrence of an address from the program counter mapping to an index where the location in an instruction cache corresponding to the index is full of valid instructions;

determining from the observations a first mapping function of the plurality of mapping functions that reduces collisions, the first mapping function determining which bits of the instruction address are deemed to be the tag, and which bits are deemed to be the cache address; and dynamically remapping according to the first mapping function determined to reduce collisions, by determining which bits of the instruction address are deemed to be the tag, and which bits are deemed to be the cache address in order to minimize collisions as determined by the observations;

writing instructions to the cache according to the first mapping function that is observed to reduce collisions without relinking a program;

determining from the observations of the mapping of instructions into the cache a mapping of the system memory address bits to a tag and an index that reduce collisions with steady state code; and changing the mapping function implemented by an address mapper and flushing the instruction cache when the mapping function is changed.

2. The method of claim 1, further comprising initiating a transfer of a copy of an instruction at a system memory address from the system memory to the instruction cache at an index, and with a tag, determined from the system memory address by the first mapping function.

3. The method of claim 2, further comprising detecting a collision that occurs when retrieval of an instruction into the cache would overwrite one of a plurality of valid instructions and determining which of one of the plurality of instructions will be overwritten.

4. The method of claim 1, further comprising comparing a tag mapped from an address produced by the program counter to the tag of an instruction stored in the instruction cache at an index mapped from the address from the program counter.

5. The method of claim 4, further comprising comparing a plurality of tags at a cache entry to determine which one, if any, of instructions stored at the entry is called for by the program counter.

6. A digital system for processing data, comprising:
an instruction cache configured to receive instructions from a system memory;
a program counter configured to provide instruction addresses;
a plurality of mapping functions, which maps bits of an address received from the program counter into a tag to identify an instruction stored in the system memory at the address provided by the program counter and an index to identify a location in an instruction cache for storing the instruction and the tag; each mapping function mapping a different number of address bits into the tag and into the index so that a different number of collisions will occur under each different mapping functions;

an address mapper configured to map and dynamically remap, during execution of multiple programs, bits of each instruction address, according to a first mapping function of the plurality of mapping functions which is observed to reduce collisions when compared to the others of the plurality of mapping functions, into a tag to identify the instruction and an index to point to a location in the cache for storing the instruction;

a collision observer configured to observe, during execution of the multiple programs, instruction cache collisions for each of the plurality of mapping functions; wherein a collision is an occurrence of an address from the program counter mapping to an index where the location in an instruction cache corresponding to the index is full of valid instructions;

a collision analyzer configured to determine from the observations, the first mapping function that reduces collisions when compared to the others of the plurality of mapping functions, the first mapping function determining which bits of the instruction address are deemed to be the tag, and which bits are deemed to be the cache address in order to minimize collisions;

wherein the collision analyzer determines collisions for the plurality of mapping functions and determines which of the plurality of mapping functions produces the least collisions with steady state code;

a controller for writing instructions to the cache according to the first mapping function that is observed to reduce collisions without relinking a program; and a mechanism configured to change the mapping function that maps the program counter into an index and a tag and another mechanism to flush the instruction cache when the mapping function is changed.

7. The system of claim 6, further comprising an instruction fetcher to cause instructions from the system memory to be copied to the instruction cache with a tag that is determined by from the mapping function at an index that is determined by the mapping function.

8. The system of claim 6, wherein the collision analyzer determines collisions for the plurality of mapping functions of system memory address bits to determine which one of the the plurality of mapping functions produces the least collisions.

9. The system of claim 6, further comprising a comparator to compare a tag mapped from an address produced by the program counter to the tag of an instruction stored in the instruction cache at an index mapped from the address produced by the program counter.

10. The system of claim 9, wherein the comparator checks a plurality of tags at a cache entry to determine which one, if any, of instructions stored at the entry is called for by the program counter.

11. The system of claim 6, wherein each successive mapping function of the plurality of mapping functions observed is determined from a previous mapping function.

12. A machine-accessible medium containing instructions effective, when executing in a data processing system, to cause said data processing system to perform operations comprising:
defining a plurality of mapping functions, which maps bits of an address received from a program counter into a tag to identify an instruction stored in the system memory at the address provided by the program counter and an index to identify a location in an instruction cache for storing the instruction and the tag; each mapping function mapping a different number of address bits into the tag and into the index so that a different number of collisions will occur under each different mapping functions;

observing instruction cache collisions over a time interval, during the execution of multiple programs, for each of the plurality of mapping functions that determine which bits of the system address are the tag and which bits are the index; wherein an instruction cache collision is an occurrence of an address from the program counter mapping to an index where the location in the instruction cache corresponding to the index is full of valid instructions;

based on the observations, determining a first mapping function of the plurality of mapping functions which maps bits of a system memory address into a tag and an index to reduce instruction cache collisions, the first mapping function determining which bits of the instruction address are deemed to be the tag, and which bits are deemed to be the cache address;

dynamically remapping bits of the system address according to the first mapping function determined to reduce collisions, by determining which bits of the instruction address are deemed to be the tag, and which bits are deemed to be the cache address in order to minimize collisions as determined by the observations;

writing instructions to the cache according to the first mapping function that is observed to reduce collisions without relinking a program;

determining from the observations of the mapping of instructions into the cache a mapping of the system memory address bits to a tag and an index that reduce collisions with steady state code; and changing the mapping function implemented by the system and causing the instruction cache contents to be flushed when the mapping function is changed.

13. The machine accessible medium of claim 12, further comprising identifying steady state code from the observations.

14. The machine accessible medium of claim 12, wherein observing collisions comprises observing collisions for the plurality of mapping functions of system memory address bits to determine which one of the plurality of different mappings produces the least collision.

* * * * *